United States Statutory Invention Registration [19]

[11] Reg. Number: H362

Madderra

[43] Published: Nov. 3, 1987

[54] RIGID WARHEAD DETONATION TRANSFER SYSTEM

[75] Inventor: Jimmy M. Madderra, Huntsville, Ala.

[73] Assignee: The United States of America as represented by the Secretary of the Army, Washington, D.C.

[21] Appl. No.: 32,792

[22] Filed: Mar. 30, 1987

[51] Int. Cl.[4] ..... F42B 13/12

[52] U.S. Cl. ..... 102/476

*Primary Examiner*—Harold J. Tudor

*Attorney, Agent, or Firm*—John C. Garvin, Jr.; Freddie M. Bush; James T. Deaton

[57] ABSTRACT

In a missile having a shaped charge warhead that is pivotable from a position in which the axis of the shaped charge is in alignment with the axis of the missile to a canted position in which the axis of the shaped charge warhead is canted relative to the axis of the missile and a rigid detonation transfer system for transferring detonation from safe and arm mechanism of the missile to the shaped charge warhead and utilizing a rigid arm with explosive therein and a precision initiation coupler on the shaped charge warhead to transfer detonation from the safe and arm mechanism to the shaped charge of the warhead to initiate explosion thereof.

4 Claims, 11 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

RIGID WARHEAD DETONATION TRANSFER SYSTEM

DEDICATORY CLAUSE

The invention described herein may be manufactured, used, and licensed by or for the Government for governmental purposes without the payment to me of any royalties thereon.

BACKGROUND OF THE INVENTION

In the past, shaped charge warheads have been aligned along the axis of the missile with the safe and arm mechanism attached to the rear of the warhead. In certain applications, this is not a sufficient arrangement for the shaped charge warhead in that it is desirable at times to cant the shaped charge warhead relative to the axis of the missile. Accordingly, there is a need for an arrangement in which the warhead can be canted and still have rigid means for transferring the detonation from the safe and arm mechanism to the shaped charge warhead.

Accordingly, it is an object of this invention to provide a rigid detonation transfer system for transferring detonation from the safe and arm mechanism to a canted shaped charge warhead of a missile.

Another object of this invention is to provide a detonation transfer system in which an acceptable gap exists between the end of the detonation transfer arm of the system and a precision initiation coupler of the shaped charge warhead.

A still further object of this invention is to provide a detonation transfer system for a shaped charge warhead in which the detonation transfer system is insulated electrically from the missile structure.

Still another object of this invention is to provide a detonation transfer system which enables the shaped charge warhead to be canted after the missile has been launched from its launch tube.

Other objects and advantages of this invention will be obvious to those skilled in this art.

SUMMARY OF THE INVENTION

In accordance with this invention, a rigid warhead detonation transfer system is provided for transferring detonation from a safe and arm mechanism to a shaped charge warhead that has been tilted relative to the center line of the missile and this rigid warhead transfer system includes a rigid arm with explosive therein for transferring the explosive train from the safe and arm mechanism to explosive in an initiation coupler which couples the detonation energy to the warhead for setting off the shaped charge warhead. Utilizing this system, the detonation wave from the rigid arm must jump a predetermined gap between the end of the rigid arm and the precision initiation coupler in order to properly transfer the detonation and always cause detonation of the shaped charge warhead.

DESCRIPTION OF THE PREFERRED EMBODIMENT

Figure 4:
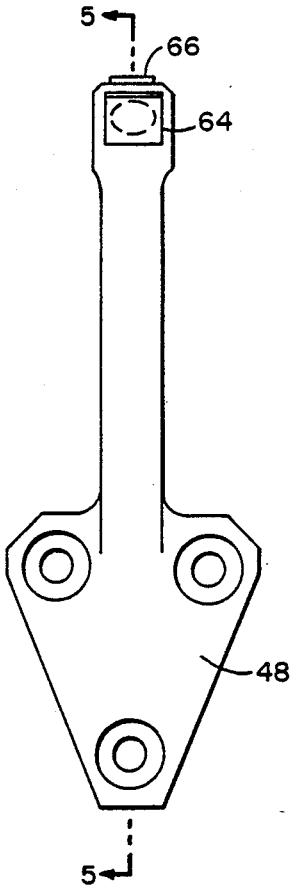
FIG. 4 is a plan view of a detonation transfer arm in accordance with this invention.
Figure 5:
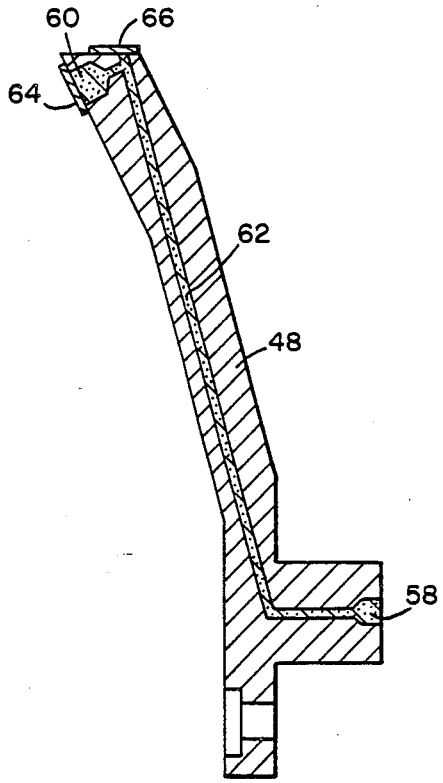
FIG. 5 is a sectional view along line 5—5 of FIG. 4.
Figure 1:
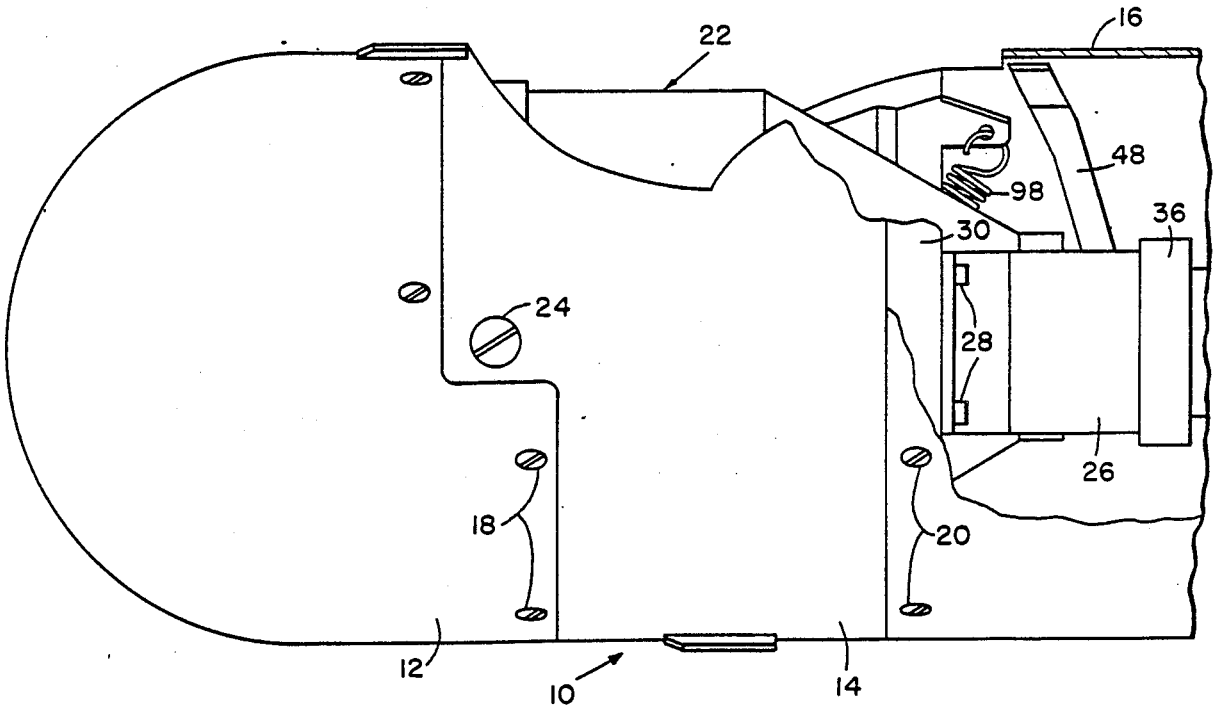
FIG. 1 is a view partially in section of a front end of a missile with a warhead therein and illustrating a rigid warhead detonation transfer system.
Figure 3:
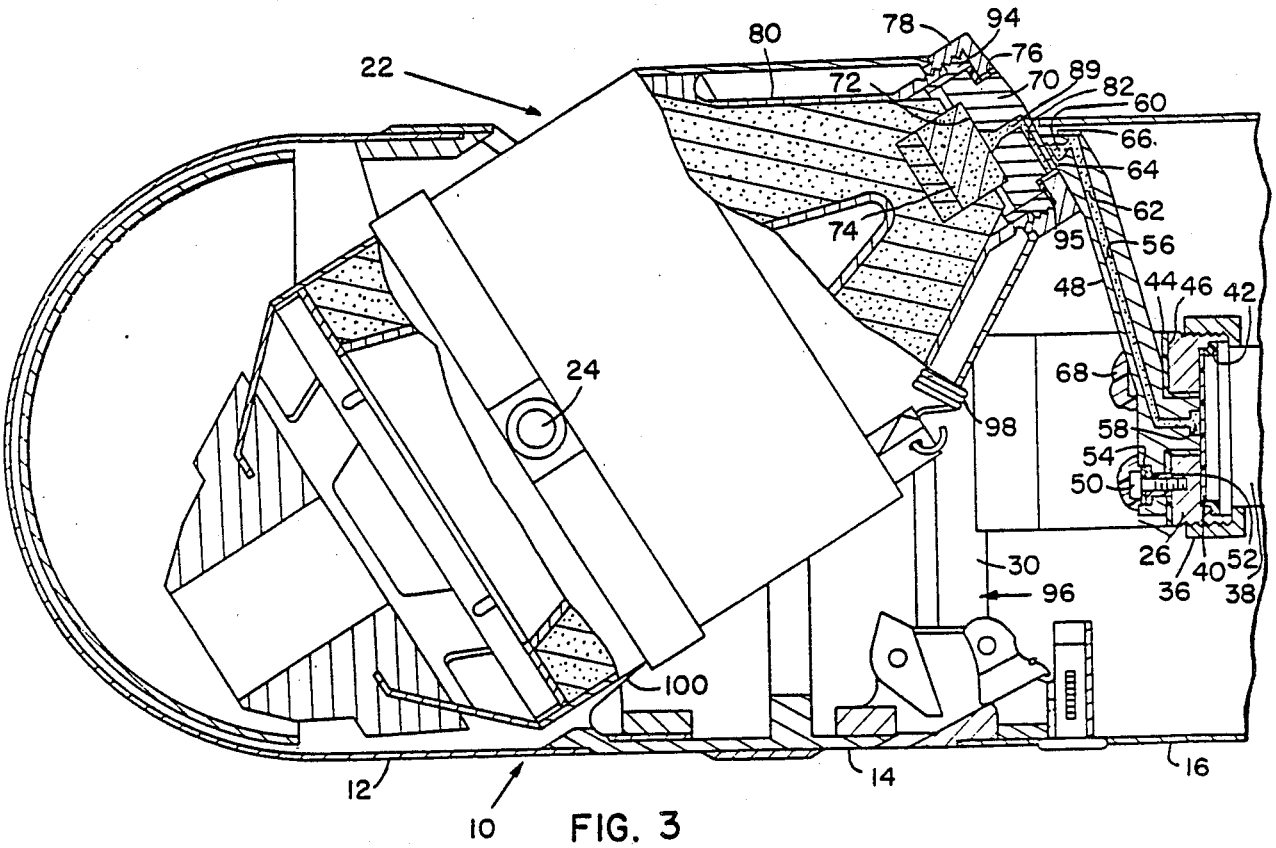
FIG. 3 is a sectional view of the front portion of a missile with a shaped charge warhead therein and illustrating the shaped charge warhead in a pivoted position with the rigid warhead detonation transfer system in position for firing the warhead.
Figure 8:
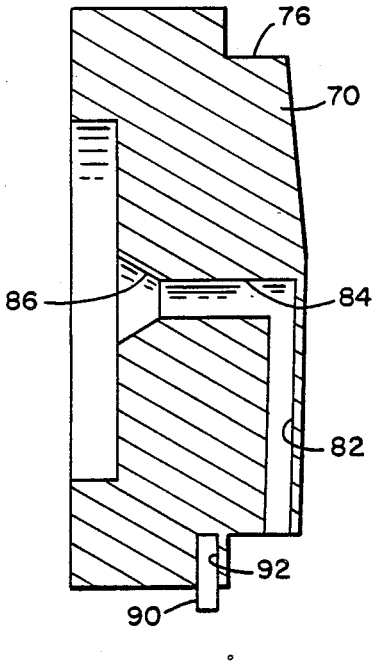
FIG. 8 is a sectional view along line 8—8 of FIG. 6.
Figure 6:
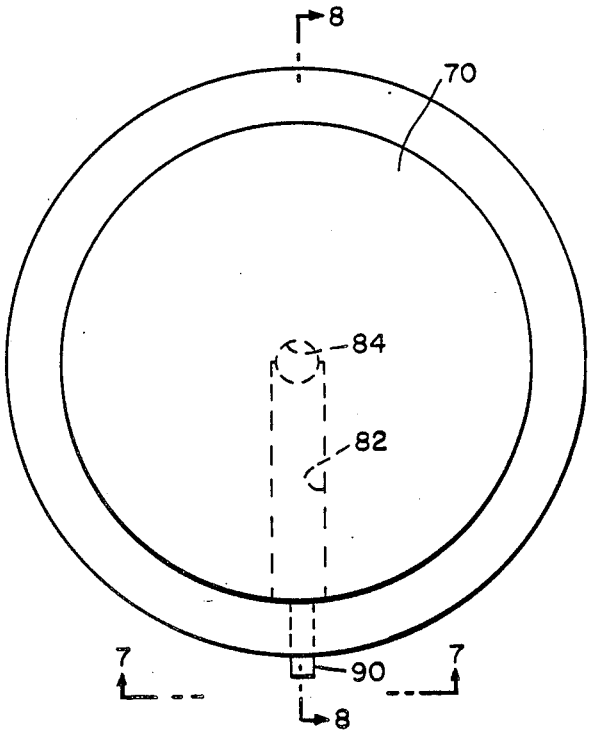
FIG. 6 is a top view of a precision initiation coupler in accordance with this invention.
Figure 7:
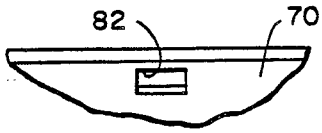
FIG. 7 is a view along line 7—7 of FIG. 6.
Figure 10:
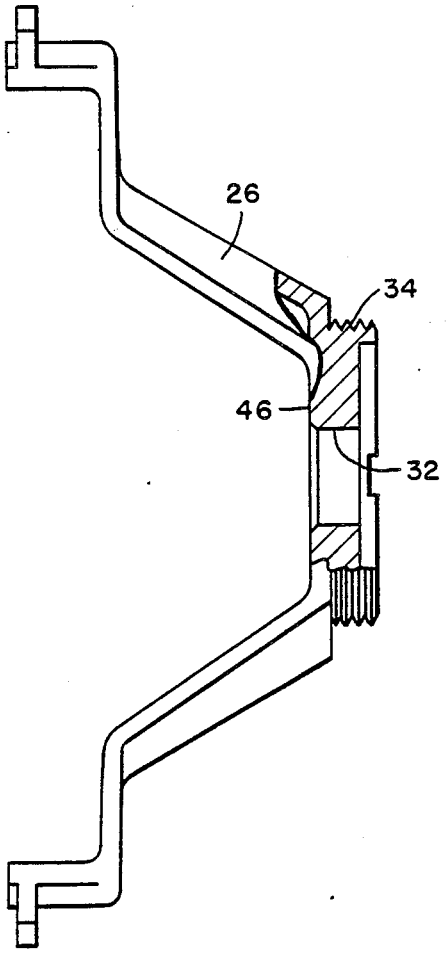
FIG. 10 is a side view partially in section illustrating a mounting bracket for the detonation transfer arm.
Figure 11:
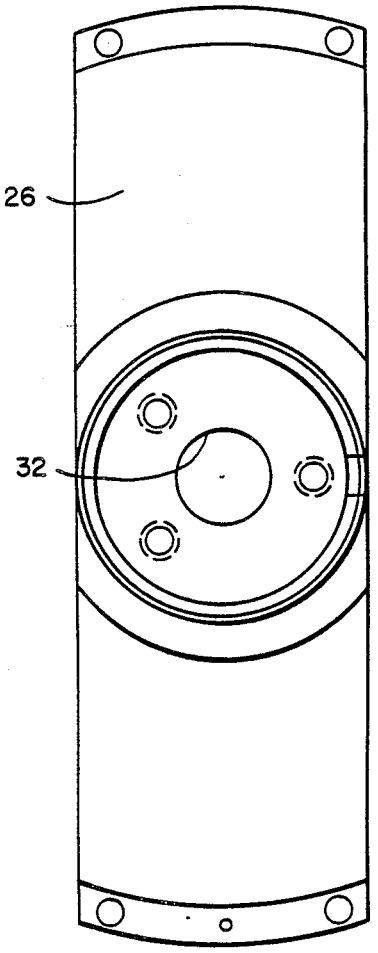
FIG. 11 is a top view of the safe and arm bracket.

Referring now to the drawing, a missile 10 includes a forward nose module or crush switch section 12, an intermediate adapter section 14, and a rear housing section 16. Forward section 12 is secured to adapter section 14 by a plurality of screws 18 and adapter 14 is secured to rear section 16 by a plurality of screws 20. Adapter section 14 has a shaped charge warhead 22 pivotally mounted therein by trunnion shafts 24. Warhead 22 is adapted to be launched in the position illustrated in FIG. 1 and has spring biasing means that biases it to a canted position after launch as illustrated in FIG. 3. The rigid detonation transfer system for the shaped charge warhead in the canted position includes safe and arm bracket 26 which is secured by bolts 28 at opposite sides of safe and arm bracket 26 to ring structure 30 of intermediate adapter 14. Safe and arm bracket 26 has a stepped bore 32 therethrough as illustrated in FIG. 10 and has threads 34 for receiving threaded retainer ring 36 for securing a conventional safe and arm mechanism 38 to bracket 26. An insulator pad 40 is placed between one end of safe and arm mechanism 38 and the enlarged portion of bore 32 and insulator bushing 42 is placed around an end portion of safe and arm mechanism 38 and an end portion of bracket 26. An insulator bushing 44 is positioned in the smaller of stepped bore 32 and over interface 46 of safe and arm bracket 26. Detonation transfer arm 48 is secured to safe and arm bracket 26 by three bolts 50. An insulator bushing 52 is mounted around each bolt 50 to insulate the bolt from detonation transfer arm 48. A washer 54 is also provided between the head of each bolt 50 and insulator bushing 52. Detonation transfer arm 48 has a bore opening 56 therethrough with enlarged openings 58 and 60 at opposite ends. An explosive 62 is placed in bore 56 and enlarged opening 58 and a booster pellet explosive is placed in enlarged opening 60. A foil disk 64 is placed in sealing relationship over the explosive booster pellet and a foil seal 66 is placed in sealing relationship over an end of bore 56 to close the bore at this position. To ensure that arm 48 is completely and electrically insulated, the heads of bolts 50 have an insulating sealant 68 placed thereover.

Figure 9:
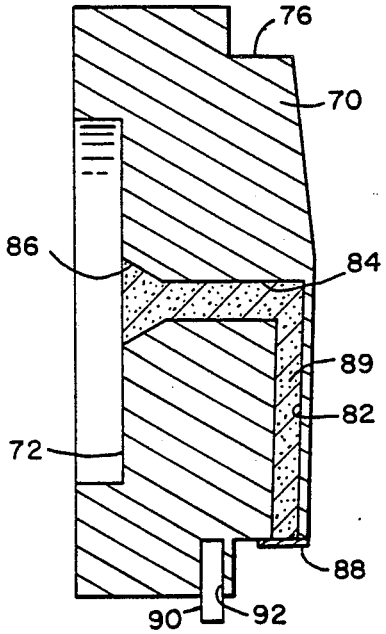
FIG. 9 is a sectional view of the precision initiation coupler with the explosive in the explosive channel thereof.

A precision initiation coupler 70 is provided and includes a recessed circular area 72 at one side for receiving one end of booster pellet 74. Precision initiation coupler 70 also has a reduced diameter portion 76 and a retainer ring 78 is utilized to clamp precision initiation coupler 70 to housing structure 80 of shaped charge warhead 22. Precision initiation coupler 70 has a generally rectangular opening 82 therein from one side that connects with a central bore 84 and an enlarged tapered opening 86. Openings 82, 84 and 86 have an explosive therein that fills each of these and a foil disk 88 seals one end of opening 82 as illustrated, (see FIG. 9). A pin 90 is mounted in opening 92 of precision initiation coupler 70 and pin 90 keys the precision initiation coupler 70 to insulation bushing 94 and insulation bushing 94 is keyed to a slot in one end of housing member 80 to ensure that explosive 89 in passage 82 is aligned with booster pellet 60 in arm 48. A compression pad 95 is also positioned between retainer ring 78 and a surface of precision initiation coupler 70. The arrangement of precision initiation coupler 70 relative to the warhead structure and arm 48 is such that the gap between booster pellet 60 and the surface of precision initiation coupler 70 when the shaped charge warhead is in the tilted position is no more than about 0.005 to 0.083 inches. If this gap is too large, the detonation transfer from booster pellet 60 to explosive 82 will not occur properly. The explosive in arm 48 and in the passages of precision initiation coupler 70 must be of an explosive material that can be placed in the passages of these members to completely fill all turns and crevices. Applicant has found that these explosive materials 62 and 89 must be an extrudable material and it has been found preferrable to pull a vacuum on these passages and then allow the explosive to be extruded into the passages to completely fill the passages. The specific pressures of vacuum that have been found acceptable has been from 1000 to 16000 psi. A specific explosive extrudable compound that can be used is one of the type found in military spec MIL-E-82-740. Any good extrudable explosive can be used.

Figure 2:
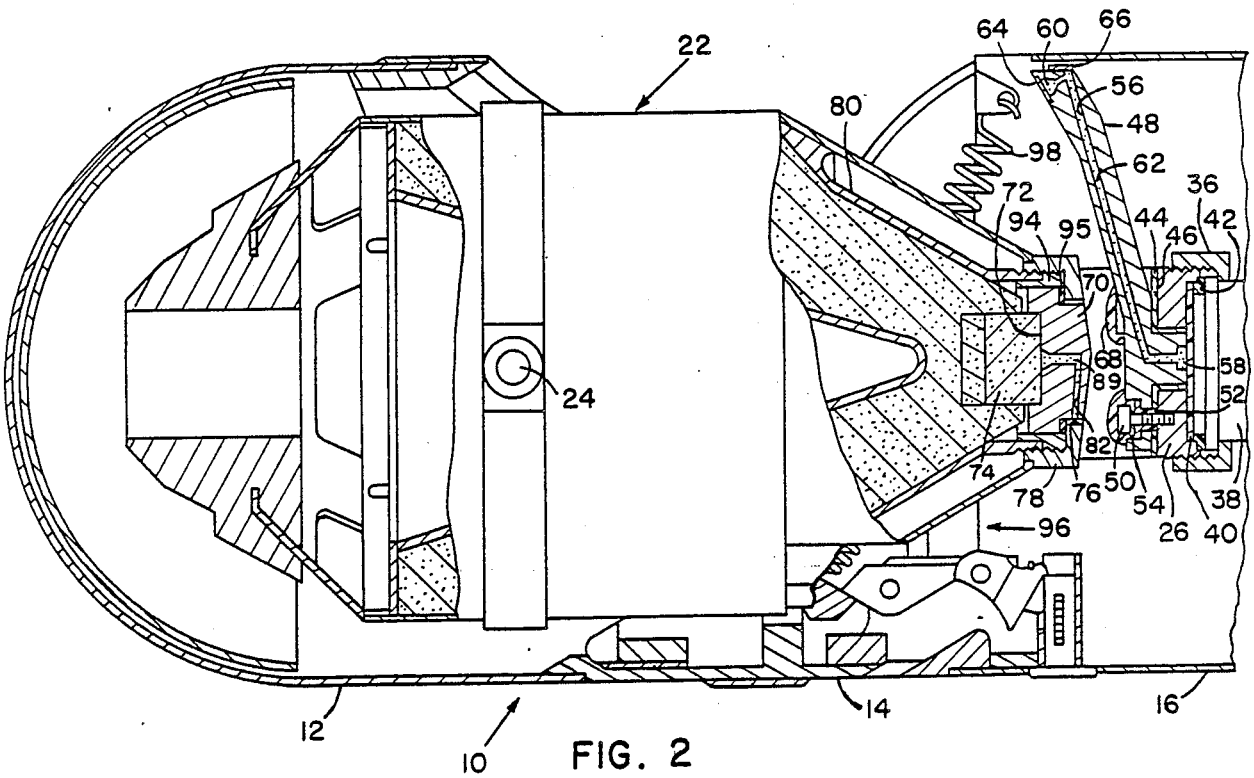
FIG. 2 is a sectional view of a front portion of a missile and illustrating details of the rigid warhead detonation transfer system.

Warhead 22 is held in the position illustrated in FIG. 2 by locking mechanism 96 that is tripped when the missile is launched from its launch tube and springs 98 at opposite sides of warhead 22 bias the warhead to the canted position illustrated in FIG. 3. In this position, leaf spring 100 holds warhead 22 locked in the canted position illustrated.

In operation, when the missile is fired from its launch tube, warhead 22 cants to the locked position illustrated in FIG. 3 and safe and arm mechanism 38 is armed in the normal manner. When the missile impacts a target, the ogive/crush switch 12 completes a circuit (not illustrated) to cause a detonator (not illustrated) in safe and arm mechanism 38 to fire into the explosive at 58 in the base of arm 48 and then up arm 48 to booster pellet 60 at the tip of arm 48. The detonation wave from booster pellet 60 traverses or jumps the gap between the end of arm 48 and the face of precision initiation coupler 70. This detonation wave initiates explosive 89 in channel 82 and the detonation travels to the center of precision initiation coupler 70 and travels through the center and initiates booster pellet 74 in the base of shaped charge warhead 22 which, in turn, initiates the shaped charge of the warhead. As will be appreciated, detonation transfer arm 48 is electrically insulated from the mounting structure to ensure against accidental detonation of the explosive therein and the gap defined between the end of arm 48 and precision initiation coupler 70 is maintained between limits in order to provide an accurate and reliable explosive path for ensuring that the shaped charge warhead is always set off.

I claim:

1. In a missile having an adaptor housing mounted along a longitudinal portion thereof with a shaped charge warhead pivotally mounted relative to said adaptor housing and pivotable from a longitudinal position in which the warhead is longitudinal of the central longitudinal axis of the missile to a tilted position in which the shaped charge warhead is canted relative to the longitudinal axis of the missile, a rigid detonation transfer system for the shaped charge warhead and including a generally U-shaped bracket secured to said adaptor structure and having safe and arm mechanism secured on one side of said bracket at a central portion thereof, a detonation transfer arm mounted on another side of said bracket and opposite said safe and arm mechanism, and a precision initiation coupler connected at an end of the shaped charge warhead, and said detonation transfer arm and said precision initiation coupler having explosive means therein for providing an explosive path for transmitting detonation in the safe and arm mechanism through said detonation transfer arm and said precision initiation coupler to the shaped charge warhead to cause the shaped charge warhead to be detonated when said shaped charge warhead is positioned in the canted position.

2. In a missile as set forth in claim 1, wherein said detonation transfer arm is electrically insulated in its mounting relative to said mounting bracket.

3. In a missile as set forth in claim 2, wherein said detonation transfer arm and said precision initiation coupler have a gap therebetween that is no more than 0.005 to 0.083 inches.

4. In a missile as set forth in claim 3, wherein said precision initiation coupler has a passage with said explosive means therein, and said passage extending from one side of the precision initiation coupler to a central portion and said explosive means also being in the central portion and connected by a booster pellet to the shaped charge of the shaped charge warhead to initiate explosion of the shaped charge warhead.

* * * * *